United States Patent
Ogawa et al.

(10) Patent No.: US 10,368,191 B2
(45) Date of Patent: Jul. 30, 2019

(54) CONFINED SPACE ESTIMATION SYSTEM AND CONFINED SPACE ESTIMATION METHOD

(71) Applicant: Hitachi, Ltd., Tokyo (JP)

(72) Inventors: Yuuichi Ogawa, Tokyo (JP); Natsuko Sugaya, Tokyo (JP); Akinori Asahara, Tokyo (JP); Hideki Hayashi, Tokyo (JP); Hitoshi Tomita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/502,677

(22) PCT Filed: Mar. 26, 2015

(86) PCT No.: PCT/JP2015/059495
§ 371 (c)(1),
(2) Date: Feb. 8, 2017

(87) PCT Pub. No.: WO2016/151863
PCT Pub. Date: Sep. 29, 2016

(65) Prior Publication Data
US 2018/0213353 A1    Jul. 26, 2018

(51) Int. Cl.
*H04W 4/021*    (2018.01)
*H04M 11/00*    (2006.01)
(Continued)

(52) U.S. Cl.
CPC ........... *H04W 4/021* (2013.01); *G06T 11/206* (2013.01); *H04M 11/00* (2013.01); *H04W 4/029* (2018.02); *H04W 4/023* (2013.01); *H04W 4/90* (2018.02)

(58) Field of Classification Search
CPC ....... H04W 4/02; H04W 4/021; H04W 4/022; H04W 4/023; H04W 4/90; G06T 11/206; G08B 21/10; G08B 25/10
See application file for complete search history.

(56) References Cited

U.S. PATENT DOCUMENTS

| | | | |
|---|---|---|---|
| 9,596,696 B1* | 3/2017 | Sevindik | H04W 72/085 |
| 2005/0026631 A1* | 2/2005 | Hull | G06Q 99/00 |
| | | | 455/456.3 |

(Continued)

FOREIGN PATENT DOCUMENTS

| | | | |
|---|---|---|---|
| JP | 5620074 B2 | 11/2014 | |
| JP | 5629282 B2 | 11/2014 | |

OTHER PUBLICATIONS

International Search Report and Written Opinion for PCT App No. PCT/JP2015/059495, dated Jun. 16, 2015, 8 pgs.

*Primary Examiner* — George Eng
*Assistant Examiner* — Umair Ahsan
(74) *Attorney, Agent, or Firm* — Procopio, Cory, Hargreaves & Savitch LLP

(57) ABSTRACT

A confined space estimation system, and a confined space estimation method capable of accurately confirming a confined space formed in the event of a disaster, estimates a confined space comprising a storage device which stores information indicating a geographical space, and a processor which divides the geographical space into grids. Based on location information sent from a terminal, the processor periodically aggregates a number of terminals within the grids or a number of terminals that passed through boundaries between the grids, extracts grids or boundaries in which the aggregated number of terminals is a predetermined number and in which there is no change in the aggregated number of terminals, determines whether the extracted grids or boundaries can be linked to form an annular shape, and, if the annular shape can be formed, estimates a geographical space configured from the grids within the formed annular shape as the confined space.

8 Claims, 13 Drawing Sheets

(51) Int. Cl.
*H04W 4/029* (2018.01)
*H04W 4/90* (2018.01)
*G06T 11/20* (2006.01)
*H04W 4/02* (2018.01)

(56) References Cited

U.S. PATENT DOCUMENTS

| | | | |
|---|---|---|---|
| 2007/0019241 A1* | 1/2007 | Yamakado | H04N 1/4051 358/3.14 |
| 2007/0038970 A1* | 2/2007 | DeMaris | G03F 1/44 716/51 |
| 2010/0197318 A1* | 8/2010 | Petersen | H04W 4/029 455/456.1 |
| 2015/0031388 A1* | 1/2015 | Chatterjee | H04W 4/021 455/456.1 |
| 2018/0213353 A1* | 7/2018 | Ogawa | G08B 21/10 |

* cited by examiner

FIG.2

GRID DEFINITION MANAGEMENT TABLE 81

| GRID ID | EAST END LONGITUDE | WEST END LONGITUDE | SOUTH END LONGITUDE | NORTH END LONGITUDE | EAST ADJACENT GRID | WEST ADJACENT GRID | SOUTH ADJACENT GRID | NORTH ADJACENT GRID |
|---|---|---|---|---|---|---|---|---|
| 10001 | 139° 40' | 139° 39' | 35° 41' | 35° 42' | 10002 | 10000 | 09001 | 110001 |
| 10002 | | | | | | | | |
| 10003 | | | | | | | | |
| ⋮ | ⋮ | ⋮ | ⋮ | ⋮ | ⋮ | ⋮ | ⋮ | ⋮ |

GRID TERMINAL COUNT MANAGEMENT TABLE 82

| AGGREGATION TIME PERIOD | GRID ID | TERMINAL COUNT |
|---|---|---|
| 2015/1/1 0:00-0:09 | 10001 | 5 |
| 2015/1/1 0:00-0:09 | 10002 | 0 |
| 2015/1/1 0:00-0:09 | 10003 | 3 |
| ⋮ | ⋮ | ⋮ |
| 2015/1/1 7:30-7:39 | 10001 | 0 |
| 2015/1/1 7:30-7:39 | 10002 | 0 |
| 2015/1/1 7:30-7:39 | 10003 | 0 |
| ⋮ | ⋮ | ⋮ |

MOBILE OBJECT DATA MANAGEMENT TABLE 83

| INDIVIDUAL IDENTIFICATION ID | GENERATED TIME | LATITUDE | LONGI-TUDE | SEA LEVEL[m] | GRID ID |
|---|---|---|---|---|---|
| 0 | 2015/1/1 0:00 | 35° 41' | 139° 40' | 30 | 10001 |
| 1 | | | | | |
| 2 | | | | | |
| ⋮ | ⋮ | ⋮ | ⋮ | ⋮ | ⋮ |

LINKED LIST MANAGEMENT TABLE 84

| HEADER | | LIST | | | | ANNULAR SHAPE DETERMINATION |
|---|---|---|---|---|---|---|
| LINKED LIST ID | TIME PERIOD | GRID ID [0] | GRID ID [1] | GRID ID [2] | ... | |
| 0 | 2015/1/1 7:00-8:00 | 10001 | 10002 | 10003 | | true |
| 1 | | | | | | false |
| 2 | | | | | | false |
| ⋮ | ⋮ | ⋮ | ⋮ | ⋮ | ⋮ | ⋮ |

841　842　843　844

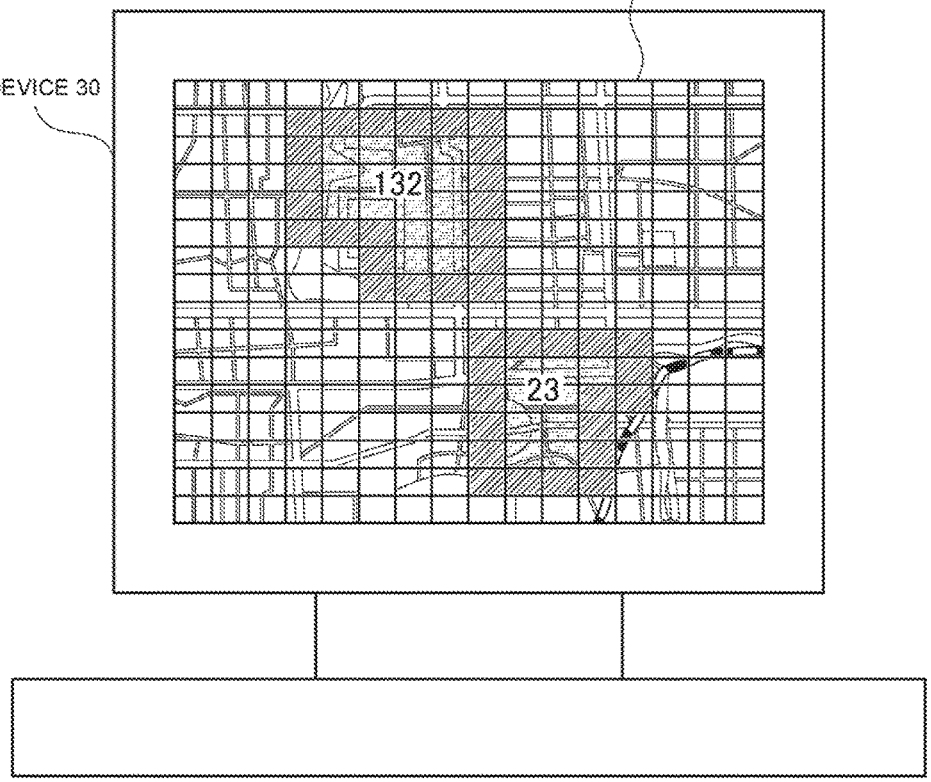

GRID DEFINITION MANAGEMENT TABLE 81A

| GRID ID | A NODE ID | EAST END LONGI-TUDE | WEST END LONGI-TUDE | SOUTH END LATI-TUDE | NORTH END LATI-TUDE | EAST ADJA-CENT GRID | WEST ADJA-CENT GRID | SOUTH ADJA-CENT GRID | NORTH ADJA-CENT GRID |
|---|---|---|---|---|---|---|---|---|---|
| 10001 | N10001 | 139° 40' | 139° 39' | 35° 41' | 35° 42' | 10002 | 10000 | 09001 | 10004 |
| 10002 | N10002 | | | | | | | | |
| 10003 | N10003 | | | | | | | | |
| ⋮ | ⋮ | ⋮ | ⋮ | ⋮ | ⋮ | ⋮ | ⋮ | ⋮ | ⋮ |

811　811A　812　813

GRID BOUNDARY PASS-THROUGH TERMINAL COUNT MANAGEMENT TABLE 82A

| AGGREGATION TIME PERIOD | GRID BOUNDARY ID | PASS-THROUGH TERMINAL COUNT |
|---|---|---|
| 2015/1/1 0:00~0:09 | X10001 | 0 |
| 2015/1/1 0:00~0:09 | Y10001 | 5 |
| 2015/1/1 0:00~0:09 | X10002 | 0 |
| 2015/1/1 0:00~0:09 | Y10002 | 1 |
| 2015/1/1 0:00~0:09 | X10003 | 0 |
| 2015/1/1 0:00~0:09 | Y10003 | 3 |
| ⋮ | ⋮ | ⋮ |

821   822A   823A

CONFINED SPACE ESTIMATION SYSTEM AND CONFINED SPACE ESTIMATION METHOD

CROSS-REFERENCE TO RELATED APPLICATIONS

This application is a U.S. National Stage entry of PCT Application No. PCT/JP2015/059495, filed on Mar. 26, 2015. The contents of the foregoing are incorporated by reference.

TECHNICAL FIELD

The present invention relates to a confined space estimation system and a confined space estimation method.

BACKGROUND ART

In recent years, in the event of a large-scale disaster across a wide geographical area, research for quickly and accurately confirming the range of space (confined space) isolated from the surrounding areas is being advanced. The quick and accurate confirmation of confined spaces will be useful in making decisions for rescue operations and relief supplies. As a conventional technology for confirming a confined space, for instance, there is a technology of dividing a geographical space into a plurality of small areas (grids), counting the number of persons remaining in the grids based on mobile object data including location information which is sent from a portable terminal as appropriate, and extracting the grids in which there is no change in the number of persons as the confined space.

Note that technologies of confirming the safety of users during a disaster by using portable terminals have been previously disclosed in various documents. For instance, PTL 1 discloses a technology of promptly confirming the safety of users based on location information sent from the portable terminals and information indicating whether they are located in the disaster area. Furthermore, PTL 2 discloses a technology of estimating that users, who did not move before and after the occurrence of a disaster, were affected by the disaster based on location information before and after the occurrence of the disaster sent from the portable terminals.

CITATION LIST

Patent Literature

[PTL 1] Japanese Patent No. 5629282
[PTL 2] Japanese Patent No. 5620074

SUMMARY OF THE INVENTION

Problems to be Solved by the Invention

Meanwhile, with the conventional technology which confirms a confined space, since no consideration is given to changes in the number of persons between a plurality of grids, when the confined space is configured from a plurality of grids, it is not possible to accurately extract the grids as the confined space. Thus, there is a need to accurately confirm a confined space even when the confined space is of a widespread area configured from a plurality of grids.

The present invention was devised in light of the foregoing points, and proposes a confined space estimation system and a confined space estimation method capable of accurately confirming a confined space that is formed in the event of a disaster.

Means to Solve the Problems

In order to resolve the foregoing problems, the present invention provides a confined space estimation system which estimates a confined space comprising a storage device which stores information indicating a geographical space, and a processor which divides the geographical space into a plurality of grids, wherein, based on location information sent from a terminal, the processor periodically aggregates a number of terminals within the grids or a number of terminals that passed through boundaries between the grids, extracts grids or boundaries in which the aggregated number of terminals is a predetermined number and in which there is no change in the aggregated number of terminals, determines whether the extracted grids or boundaries can be linked to form an annular shape, and estimates, if the annular shape can be formed, a geographical space configured from the grids within the formed annular shape as the confined space.

In order to resolve the foregoing problems, the present invention additionally provides a confined space estimation method of a confined space estimation system which estimates a confined space, wherein the confined space estimation system comprises a storage device which stores information indicating a geographical space, and a processor which divides the geographical space into a plurality of grids, and wherein the confined space estimation method comprises a first step of the processor periodically aggregating a number of terminals within the grids or a number of terminals that passed through boundaries between the grids based on location information sent from a terminal, a second step of the processor extracting grids or boundaries in which the aggregated number of terminals is a predetermined number and in which there is no change in the aggregated number of terminals, a third step of the processor determining whether the extracted grids or boundaries can be linked to form an annular shape, and a fourth step of the processor estimating, if the annular shape can be formed, a geographical space configured from the grids within the formed annular shape as the confined space.

Advantageous Effects of the Invention

According to the present invention, it is possible to accurately confirm a confined space that is formed in the event of a disaster.

BRIEF DESCRIPTION OF DRAWINGS

FIG. 2 is an internal configuration diagram of the grid definition management table.

FIG. 3 is an internal configuration diagram of the grid terminal count management table.

FIG. 4 is an internal configuration diagram of the mobile object data management table.

FIG. 5 is an internal configuration diagram of the linked list management table.

FIG. 6 is an internal configuration diagram of the confined space management table.

FIG. 7 is a screen configuration diagram of the confined space result display screen.

DESCRIPTION OF EMBODIMENTS

An embodiment of the present invention is now explained in detail with reference to the appended drawings.

(1) First Embodiment

In the first embodiment, explained is a configuration of dividing a geographical space into a plurality of small areas (grids), counting a number of terminals located within the grids based on mobile object data including location information which is sent from a motion sensor of a portable terminal or the like as appropriate, and extracting, as a confined space, a space that is formed by linking the grids in which the number of terminals remains at 0 without any change.

(1-1) Overall Configuration of System

Figure 1:
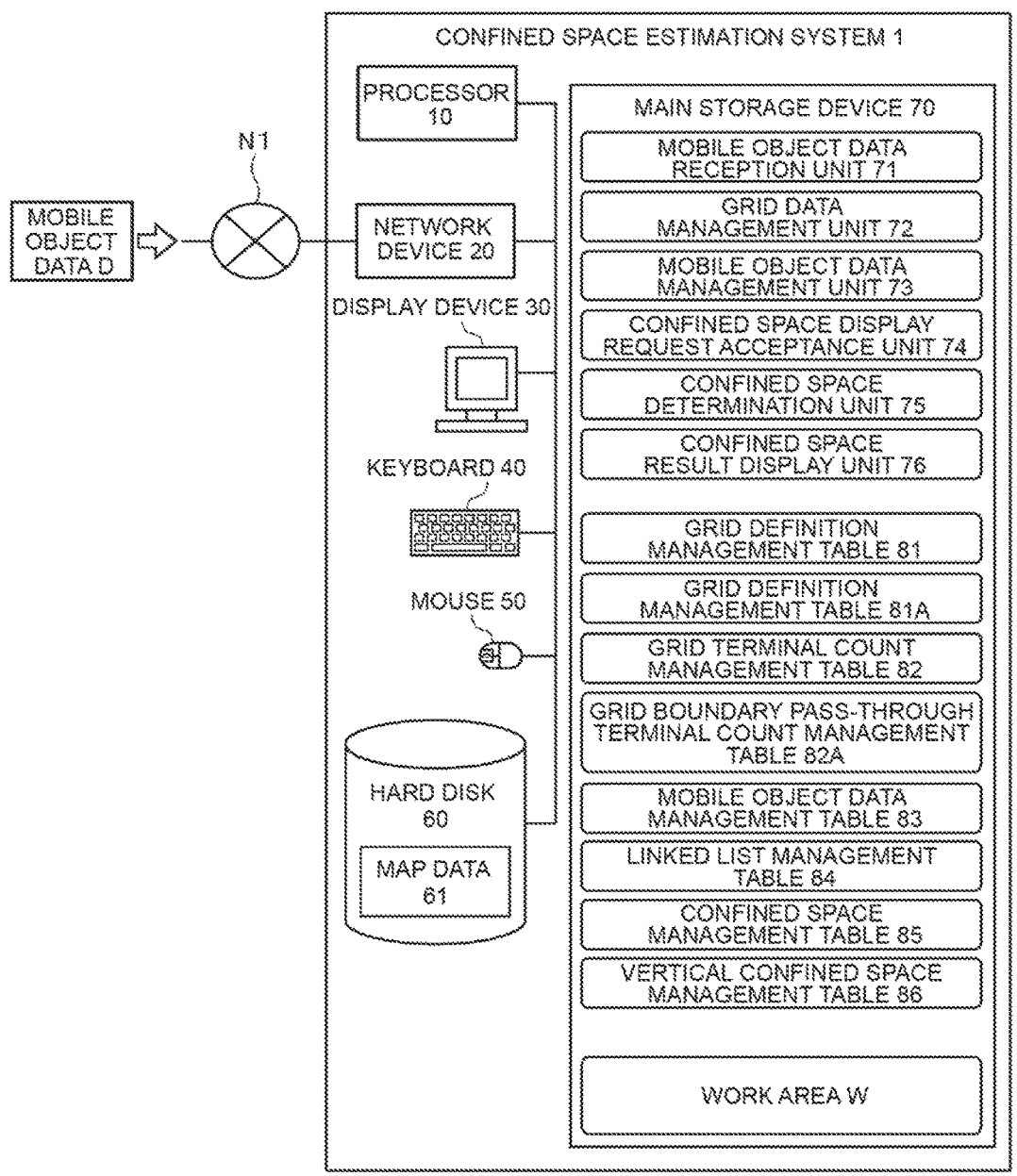
FIG. 1 is an overall configuration diagram of the confined space estimation system.

FIG. 1 shows an overall configuration of a confined space estimation system 1. The confined space estimation system 1 is a computer system configured by comprising a processor 10, a network device 20, a display device 30, a keyboard 40, a mouse 50, a hard disk 60 and a main storage device 70.

The processor 10 is a central processing unit which governs the control of operations of the confined space estimation system 1 through coordination with various programs stored in the main storage device 70. The network device 20 is a communication device which receives mobile object data D via a network N1. The communication device may be, for example, an NIC (Network Interface Card) or the like.

The mobile object data D is data that is periodically sent from a portable terminal (not shown), and includes individual identification information and location information of the portable terminal. Furthermore, the network N1 is, for example, a communication line such as a LAN (Local Area Network) or a WAN (Wide Area Network).

The display device 30 is, for example, a display device such as an LCD (Liquid Crystal Display). The keyboard 40 and the mouse 50 are devices for receiving the input operations of the user. The hard disk 60 is a storage device which stores large volumes of data. Here, the hard disk 60 stores map data 61. Note that the map data 61 may be data which simply indicates a geographical space, or may be data including geographical information and additional information acquired, for instance, by geographic information systems (GIS).

The main storage device 70 is a storage device which stores various programs and various tables. The various programs include a mobile object data reception unit 71, a grid data management unit 72, a mobile object data management unit 73, a confined space display request acceptance unit 74, a confined space determination unit 75 and a confined space result display unit 76.

Moreover, the various tables include grid definition management tables 81, 81A, a grid terminal count management table 82, a grid boundary pass-through terminal count management table 82A, a mobile object data management table 83, a linked list management table 84, a confined space management table 85 and a vertical confined space management table 86.

Note that the grid definition management table 81A and the grid boundary pass-through terminal count management table 82A will be explained in the second embodiment. Furthermore, the vertical confined space management table 86 will be explained in the third embodiment. Moreover, the main storage device 70 additionally comprises a work area W which temporarily stores data.

(1-2) Table Configuration

The various tables stored in the main storage device 70 are now explained with reference to FIG. 2 to FIG. 6.

FIG. 2 shows the internal configuration of the grid definition management table 81. The grid definition management table 81 is a table for associating and managing the grids on the map and the latitude/longitude, and is configured from a grid ID column 811, a latitude/longitude column 812 and an adjacent grid ID column 813. Note that, while the shape of the grids in this embodiment is anticipated as being square, the shape of the grids does not necessarily have to be square.

The grid ID column 811 stores the ID which identifies the respective grids that are set in advance on the map. The latitude/longitude column 812 stores the latitude/longitude which identify the location on the map based on numerical values. The adjacent grid ID column 813 stores the ID which identifies the grid (adjacent grid) that is adjacent to the target grid.

Accordingly, in the case of FIG. 2, the grid that is identified by having a grid ID of "10001" has an east end longitude of "139 degrees, 40 minutes", a west end longitude of "139 degrees, 39 minutes", a south end latitude of "35 degrees, 41 minutes", and a north end latitude of "35 degrees, 42 minutes".

Furthermore, the ID of the east adjacent grid that is adjacent to the east end of this grid is "10002", the ID of the west adjacent grid that is adjacent to the west end of this grid is "10000", the ID of the sound adjacent grid that is adjacent to the south end of this grid is "09001", and the ID of the north adjacent grid that is adjacent to the north end of this grid is "110001".

FIG. 3 shows the internal configuration of the grid terminal count management table 82. The grid terminal count management table 82 is a table for managing the number of terminals located in the grids for each aggregation time period, and is configured from an aggregation time period column 821, a grid ID column 822 and a terminal count column 823.

The aggregation time period column 821 stores the aggregation time period that the number of terminals located in the grids was aggregated. The grid ID column 822 stores the ID which identifies the respective grids that are set in advance on the map. The terminal count column 823 stores the number of terminals located in the grids in the aggregation time period.

Accordingly, in the case of FIG. 3, "5" portable terminals are located in a grid that is identified by having a grid ID of "10001" during the aggregation time period of "2015/1/10: 00-0:09". Meanwhile, "0" portable terminals are located in the same grid identified by having a grid ID of "10001" during the aggregation time period of "2015/1/17:30-7:39".

FIG. 4 shows the internal configuration of the mobile object data management table 83. The mobile object data management table 83 is a table for managing the identifying information and location information of the portable terminal, and is configured from an individual identification ID column 831, a generated time column 832, a location information column 833 and a grid ID column 834.

The individual identification ID column 831 stores the individual identification ID which identifies the portable terminal. The generated time column 832 stores the time that the mobile object data D was generated. The location information column 833 stores the latitude/longitude and sea level which identify the location on the map based on numerical values. The grid ID column 834 stores the ID which identifies the respective grids that are set in advance on the map.

Accordingly, in the case of FIG. 4, the time that the portable terminal having an individual identification ID of "0" generated the mobile object data D is "2015/1/10:00", the location of the portable terminal at this time is a location having a latitude of "35 degrees, 41 minutes", a longitude of "139 degrees, 40 minutes", and a sea level of "30" (m), and the grid ID of the grid that is set in this location is "10001".

FIG. 5 shows the internal configuration of the linked list management table 84. The linked list management table 84 is a table for managing, as a linked list, a list of the respective grids in cases where the adjacent grids in which the number of terminals is 0 are sequentially linked, and is configured from a linked list ID column 841, a time period column 842, a linked list column 843 and an annular shape determination column 844.

The linked list ID column 841 stores the ID which identifies the linked list. The time period column 842 stores the time period that the linked list was generated. The linked list column 843 stores the grid ID of the adjacent grids in which the number of terminals is 0 (these grids are hereinafter specifically referred to as the "grids to be linked"). The annular shape determination column 844 stores the determination result on whether an annular shape can be formed with the grids to be linked.

Accordingly, in the case of FIG. 5, the linked list having a linked list ID of "0" was generated during the time period of "2015/1/17:00-8:00", and is a list that is created when sequentially linking the grids to be linked each having an ID of "10001", "10002", "10003" . . . . Furthermore, an annular shape can be formed ("true") when these grids to be linked are sequentially linked.

Note that the term "annular shape" in this embodiment is not necessarily limited to a circular shape, and is a collective designation of the shape that surrounds one or more grids. For instance, if a shape surrounding one or more grids is formed internally when the grids to be linked are sequentially linked, then that shape is referred to an annular shape even if the formed shape is a polygonal shape such as a triangle or a square, or any other asymmetrical shape.

FIG. 6 shows the internal configuration of the confined space management table 85. The confined space management table 85 is a table for managing the extracted confined space, and is configured from a confined space ID column 851, a linked list ID column 852 and a terminal count column 853.

The confined space ID column 851 stores the ID which identifies the extracted confined space. The linked list ID column 852 stores the ID which identifies the linked list. The terminal count column 853 stores the number of terminals located in the extracted confined space.

Accordingly, in the case of FIG. 6, the confined space having a confined space ID of "0" is formed within a plurality of grids contained in the linked list identified by having a linked list ID of "0", and the number of terminals in the confined space is "132" terminals.

(1-3) Screen Configuration

FIG. 7 shows a screen configuration of the confined space result display screen G1. The confined space result display screen G1 is a screen that is displayed by the display device 30. On the confined space result display screen G1, displayed are a geographical space of a predetermined range indicated based on the map data 61, and grids that are obtained by dividing the geographical space into a plurality of predetermined areas. Confined spaces are also identified.

With regard to the identification of the confined spaces, specifically, among the plurality of grids that are displayed on the geographical space, the plurality of grids to be linked included in the linked list (FIG. 5) and which form an annular shape are identified based on a color that is different from the other grids. In other words, the adjacent grids that form an annular shape when linking the adjacent grids, in which the number of terminals is 0 during a predetermined time period, are identified. Note that the grids in the confined space are also identified.

Furthermore, the number of terminals located in the confined space is also displayed on the confined space result display screen G1. Here, two confined spaces are displayed, and 132 portable terminals are located in one confined space, and 23 portable terminals are located in the other confined space. By confirming this confined space result display screen G1, the user can confirm that there are two confined spaces and that 132 persons are isolated in one confined space and 23 persons are isolated in the other confined space.

(1-4) Flowchart

The processing contents of the various programs stored in the main storage device 70 are now explained with reference to FIG. 8 to FIG. 11. In the ensuing explanation, while each type of processing is executed based on the coordination of the processor 10 and the various programs, for the sake of convenience of explanation, the processing entity will be explained as the various programs.

Figure 8:
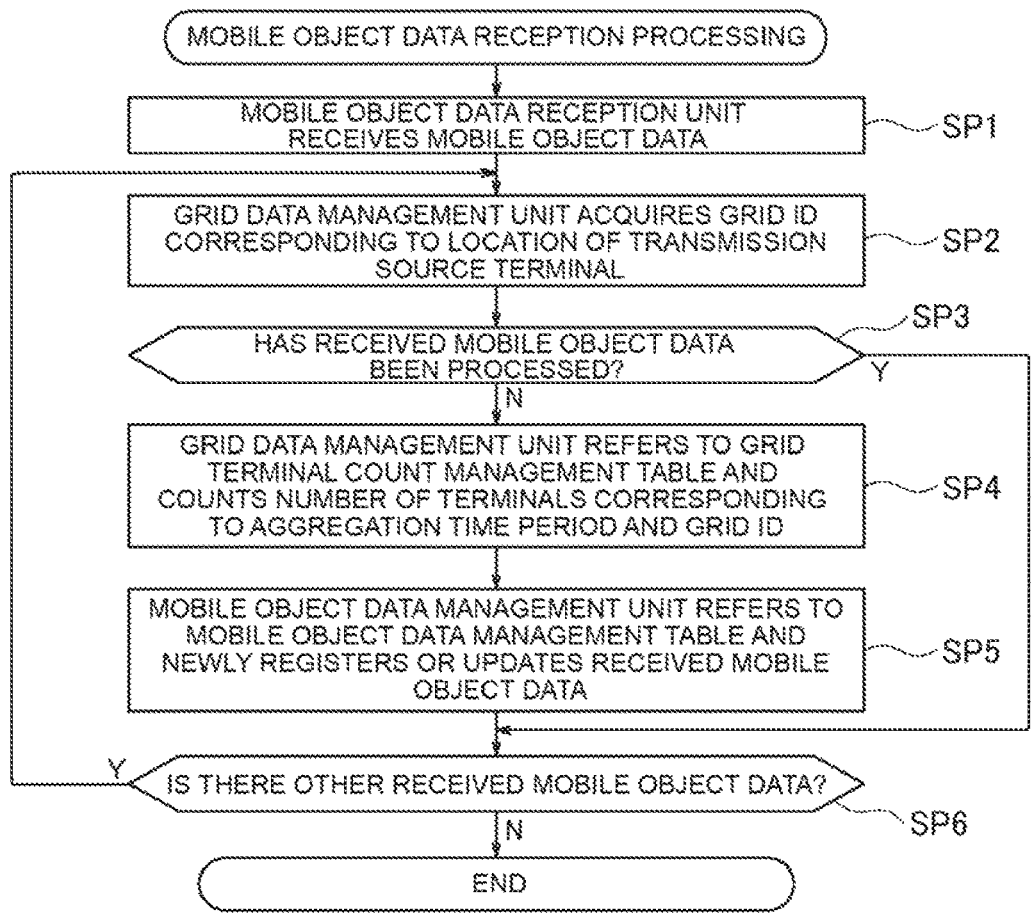
FIG. 8 is a flowchart of the mobile object data reception processing.

FIG. 8 shows a flowchart of the mobile object data reception processing. The mobile object data reception processing is executed by the mobile object data reception unit 71, the grid data management unit 72 and the mobile object data management unit 73 when the mobile object data D is sent from a portable terminal.

Foremost, the mobile object data reception unit 71 receives, via the network device 20, the mobile object data D that was sent from the portable terminal (SP1). Subsequently, the grid data management unit 72 acquires the location (latitude, longitude, sea level, etc.) of the portable terminal (transmission source terminal) that sent the mobile object data D based on the location information included in the received mobile object data D. The grid data management unit 72 thereafter refers to the grid definition management table 81, and acquires the grid ID corresponding to the location of the transmission source terminal (SP2).

Subsequently, the grid data management unit 72 refers to the mobile object data management table 83, and determines whether the mobile object data D received in step SP1 has already been processed (SP3).

Specifically, in step SP3, the grid data management unit 72 determines whether the same information as the individual identification ID, the aggregation time period including the generated time, and the grid ID of the mobile object data D received in step SP1 is stored in the mobile object data management table 83.

When a positive result is obtained in the determination of step SP3 (SP3: Y), the grid data management unit 72 proceeds to step SP6. Meanwhile, when a negative result is obtained in the determination of step SP3 (SP3: N), the grid data management unit 72 refers to the grid terminal count management table 82, and counts the number of terminals corresponding to the aggregation time period and the grid ID acquired in step SP2 (SP4).

Specifically, in step SP4, the grid data management unit 72 searches, in grid terminal count management table 82, for the aggregation time period including the generated time acquired from the mobile object data D in step SP3. Subsequently, the grid data management unit 72 searches for the grid ID acquired in step SP2 among the plurality of grid IDs corresponding to the aggregation time period obtained as the search result. When the same grid ID as the grid ID acquired in step SP2 is obtained as the search result, the grid data management unit 72 counts the number of terminals corresponding to that grid ID.

Subsequently, the mobile object data management unit 73 refers to the mobile object data management table 83, and updates, via new registration or overwriting, the individual identification ID, the generated time, and the location information (latitude, longitude, sea level, etc.) included in the mobile object data D received in step SP1, and the grid ID acquired in step SP2 (SP5).

Subsequently, the mobile object data reception unit 71 determines whether any other mobile object data D has been received (SP6). When a positive result is obtained in this determination (SP6: Y), the mobile object data reception unit 71 proceeds to step SP2. In the foregoing case, the grid data management unit 72 or the mobile object data management unit 73 once again executes the processing explained above. Meanwhile, when a negative result is obtained in the foregoing determination (SP6: N), the mobile object data reception unit 71 ends this processing.

The start or end of the series of processing of steps SP1 to SP5 may also be started or ended, for instance, when a request by the user is input via the keyboard 40 or the mouse 50 irrespective of whether the mobile object data D is received. If the processing is to be started when a request is input by the user, the mobile object data reception unit 71 will stand by until the mobile object data D is received, and execute step SP1 at the timing that the mobile object data D is received.

Figure 9:
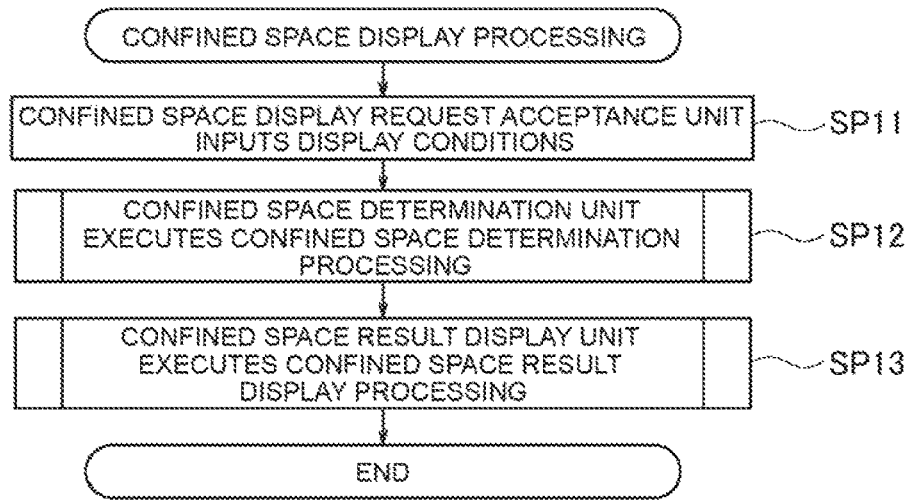
FIG. 9 is a flowchart of the confined space display processing.

FIG. 9 shows a flowchart of the confined space display processing. The confined space display processing is executed by the confined space display request acceptance unit 74, the confined space determination unit 75 and the confined space result display unit 76 when an input from the user is received.

Foremost, the confined space display request acceptance unit 74 inputs the display conditions that were received from the user via the keyboard 40 or the mouse 50 (SP11). The display conditions are, for example, the area and time period to be displayed.

Subsequently, the confined space determination unit 75 executes the confined space determination processing (SP12). While the details of the confined space determination processing will be described later (FIG. 10), a brief explanation would be that the confined space determination unit 75 extracts the grids in which the number of terminals is 0 among the plurality of grids that satisfy the display conditions input in step SP11. When the adjacent grids (grids to be linked) in which the number of terminals is 0 are sequentially linked, if an annular shape is formed, the space within the annular shape is determined as a confined space.

Subsequently, the confined space result display unit 76 executes the confined space result display processing (SP13). While the details of the confined space display processing will be described later (FIG. 11), a brief explanation would be that the confined space result display unit 76 displays, in a distinguishable manner, the confined space on a geographical space which satisfies the display conditions input in step SP11. When the foregoing processing is executed, the confined space display processing is ended.

Figure 10:
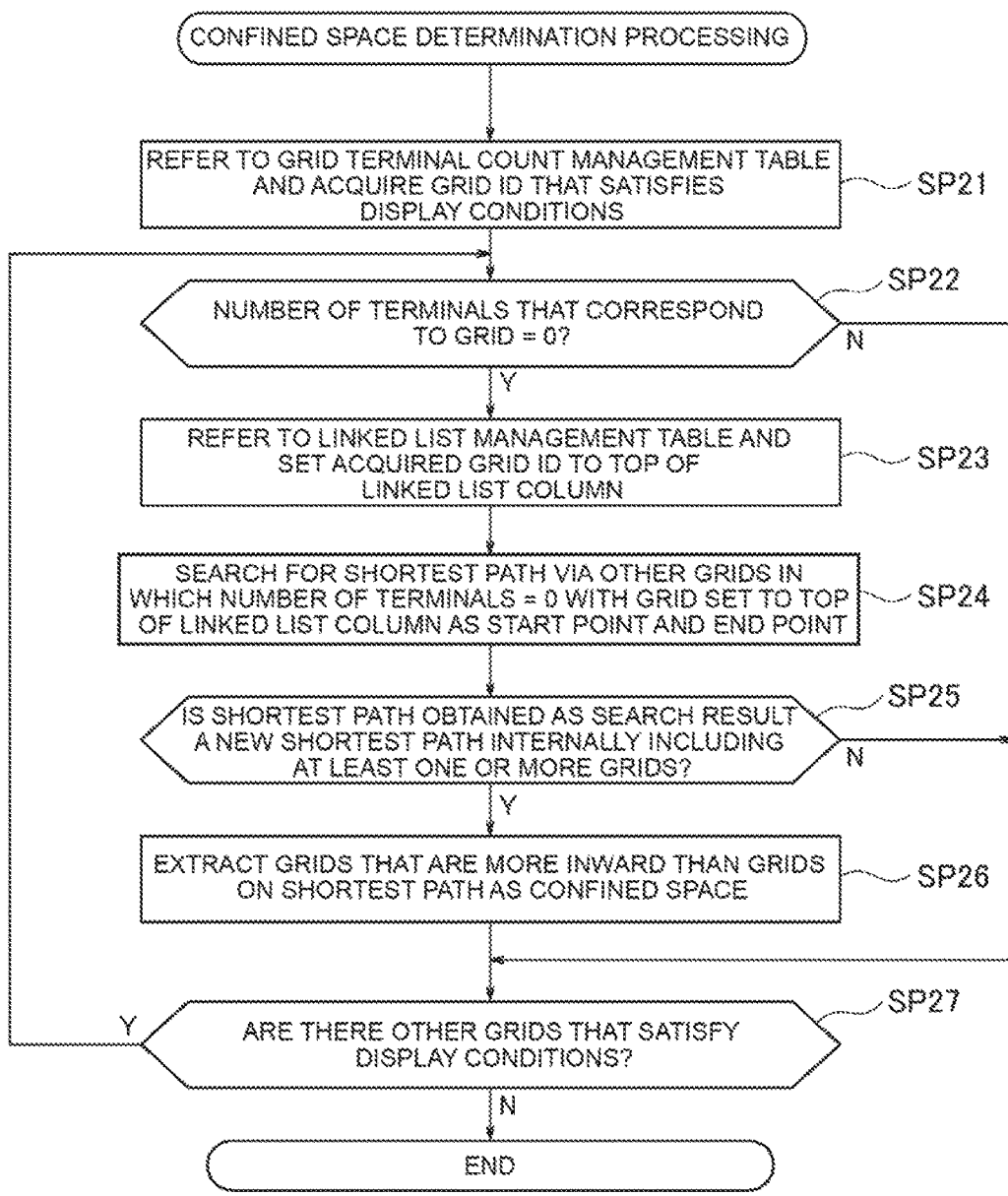
FIG. 10 is a flowchart of the confined space determination processing.

FIG. 10 shows a flowchart of the confined space determination processing. The confined space determination processing is executed by the confined space determination unit 75 when the processing of the confined space display processing (FIG. 9) proceeds to step SP12.

Foremost, the confined space determination unit 75 refers to the grid terminal count management table 82, and acquires the grid ID which satisfies the display conditions (area to be displayed and time period) input in step SP11 of the confined space display processing (FIG. 9) (SP21).

Specifically, the confined space determination unit 75 foremost refers to the grid definition management table 81, and acquires the grid ID of the grids included in the area to be displayed input in step SP11. Subsequently, the confined space determination unit 75 refers to the grid terminal count management table 82, and acquires the aggregation time period that coincides with the time period input in step SP11 or that includes this time period.

The confined space determination unit 75 thereafter refers to the grid terminal count management table 82, searches for the grid ID of the grids included in the area to be displayed among the grid IDs corresponding to the acquired aggregation time period, and acquires the grid ID that was obtained as the search result.

Subsequently, the confined space determination unit 75 refers to the grid terminal count management table 82, and determines whether the number of terminals corresponding to the grid ID acquired in step SP21 is 0 (SP22). When a negative result is obtained in this determination (SP22: N), the confined space determination unit 75 proceeds to step SP27.

Meanwhile, when a positive result is obtained in the foregoing determination (SP22: Y), the confined space determination unit 75 refers to the linked list management table 84, and sets the grid ID acquired in step SP21 at the top of the linked list column 843 (SP23). The confined space determination unit 75 thereafter searches for the shortest path with the grid set at the top of the linked list as the start and end and which goes through other grids in which the number of terminals is 0 (SP24).

As the method of searching for the shortest path in step SP24, Dijkstra's algorithm or Bellman-Ford algorithm may be used. For instance, when using Dijkstra's algorithm, the grids in which the number of terminals is 0 are deemed to be nodes, the boundary of adjacent grids in which the number of terminals is 0 is deemed to be an edge, and the grid set at the top of the linked list is set as the start node and the end node.

The shortest path from the start node to the end node via intermediate nodes, when the distance between the adjacent grids is 1, is searched. Note that information of the grids contained in the searched path is stored in the linked list management table 84.

Subsequently, in cases where a shortest path was obtained as a result of searching for the shortest path in step SP24, the confined space determination unit 75 determines whether the obtained shortest path is a new shortest path internally containing at least one or more grids (SP25). In order to confirm the number of persons who are isolated by acquiring the number of terminals in the confined space, at least one grid must exist in the space that is confined by the shortest path.

When the confined space determination unit 75 obtains a negative result in the determination of step SP25 (SP25: N), the confined space determination unit 75 determines that it was not possible to extract a confined space in connection with the target grids acquired in step SP21, and cancels the linked list stored in the linked list management table 84 or sets that linked list to "false", and then proceeds to step SP27.

Meanwhile, when the confined space determination unit 75 obtains a positive result in the determination of step SP25 (SP25: Y), the confined space determination unit 75 extracts the grids located more internally than the grids on the shortest path as a confined space (SP26). The confined space determination unit 75 thereafter refers to the confined space management table 85, and registers the linked list ID and the number of terminals located in the confined space.

Subsequently, the confined space determination unit 75 determines whether there are other grids that satisfy the display conditions (SP27). When a positive result is obtained in this determination (SP27: Y), the confined space determination unit 75 proceeds to step SP22, and repeats the foregoing processing (SP22 to SP27) to the other grids. Meanwhile, when a negative result is obtained in the foregoing determination (SP27: N), the confined space determination unit 75 determines that all grids that satisfy the display conditions have been processed, and then ends this processing.

Figures 11, 12:
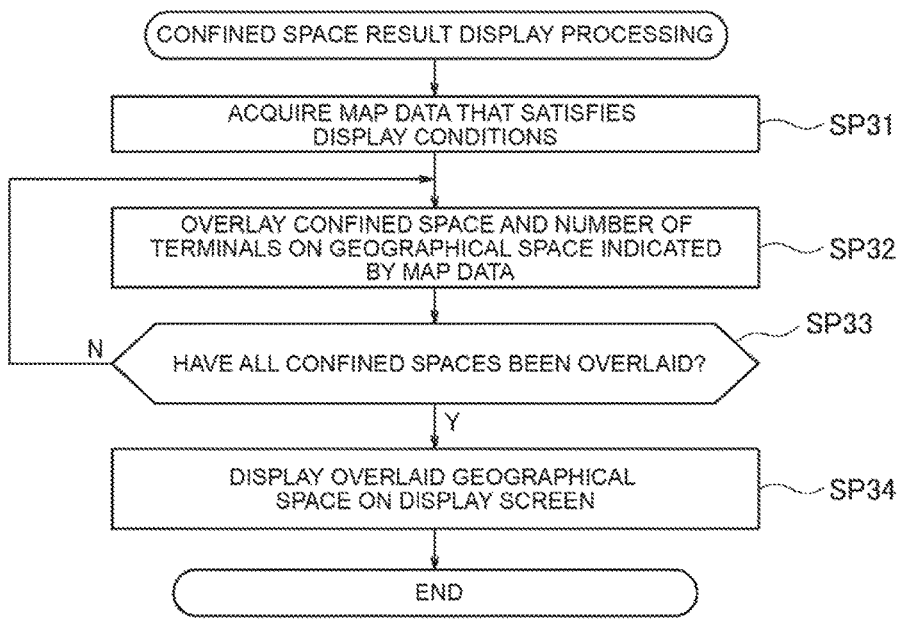
FIG. 11 is a flowchart of the confined space result display processing.
FIG. 12 is an internal configuration diagram of the grid definition management table.

FIG. 11 shows a flowchart of the confined space result display processing. The confined space result display processing is executed by the confined space result display unit 76 when the processing of the confined space display processing (FIG. 9) proceeds to step SP13.

Foremost, the confined space result display unit 76 acquires, from the hard disk 60, the map data 61 which satisfies the display condition (area to be displayed) input in step SP11 of the confined space display processing (FIG. 9) (SP31). Subsequently, the confined space result display unit 76 overlays, on the geographical space indicated based on the map data 61, the confined space and the number of terminals located in that confined space (SP32).

Note that, when overlaying the confined space and the number of terminals on the geographical space in step SP32, the confined space result display unit 76 foremost refers to the confined space management table 85, and then acquires the linked list ID and the number of terminals corresponding to one confined space.

Subsequently, the confined space result display unit 76 refers to the linked list management table 84, and acquires the grid IDs of the grids to be linked. The confined space result display unit 76 thereafter refers to the grid definition management table 81, acquires the location of the acquired grid IDs, and overlays the grids at the acquired location and additionally overlays the number of terminals therein.

Subsequently, the confined space result display unit 76 refers to the confined space management table 85, and determines whether the overlay was performed for all confined spaces (SP33). When a negative result is obtained in this determination (SP33: N), the confined space result display unit 76 proceeds to step SP32, and executes the processing of step SP33 explained above to the other confined spaces.

Meanwhile, when a positive result is obtained in the foregoing determination (SP33: Y), the confined space result display unit 76 displays the overlaid geographical space on the display screen of the display device 30 (SP34), and then ends this processing.

(1-5) Effect of First Embodiment

According to the foregoing first embodiment, by dividing a geographical space into a plurality of grids, counting the number of terminals located within the grids based on mobile object data including location information which is sent from a portable terminal as appropriate, and, if an annular shape can be formed by linking the grids in which the number of terminals remains at 0 without any change, it is possible to extract the space configured from the grids within the formed annular shape as a confined space. In the foregoing case, the actual confined space is configured from a plurality of grids, and, even when the number of persons existing within the grids changes as a result of people moving across the grids in the confined space, the space can be extracted as a confined space, and a confined space across a wide geographical area can be accurately confirmed.

Here, while virtual objects referred to as grids were used to confirm a confined space across a wide geographical area, the configuration of the present invention is not limited thereto, and, for instance, real objects may also be used.

When using real objects, intersections that are established in advance on an actual geographical space may be set as nodes. In the foregoing case, in cases where nodes in which the traffic is 0 are linked and it is possible to form an annular shape, the confined space within the annular shape may be extracted as a confined space.

Furthermore, as another example, the detection ranges of beacons installed in advance on an actual geographical space may be set as nodes. In the foregoing case, in cases where nodes in which the number of detections is 0 are linked and it is to form an annular shape, the confined space within the annular shape may be extracted as a confined space. When beacons are used, in step SP1 of the mobile object data reception processing (FIG. 8), the mobile object data reception unit 71 acquires the individual identification ID and the generated time included in the mobile object data D, and the grid ID (beacon ID) from the beacon (SP1). Subsequently, step SP2 is omitted, and the grid data management unit 72 continues to execute the processing of step SP3 onward.

(2) Second Embodiment

In the second embodiment, explained is a configuration of dividing a geographical space into a plurality of grids, counting a number of terminals that passed through the boundary (grid boundary) between the grids based on mobile object data including location information which is sent from a portable terminal or the like as appropriate, and extracting, as a confined space, a space that is formed by linking the grid boundaries in which the pass-through terminal count remains at 0 without any change. Note that the configuration that is the same as the first embodiment is given the same reference numeral and the explanation thereof is omitted.

(2-1) Table Configuration

The various tables stored in the main storage device 70 are now explained with reference to FIG. 12 to FIG. 15.

FIG. 12 shows the internal configuration of the grid definition management table 81A. The grid definition management table 81A is a table that is used in the second embodiment in substitute for the grid definition management table 81 (FIG. 2) of the first embodiment.

Since the grid ID column 811, the latitude/longitude column 812 and the adjacent grid ID column 813 are the same as the respective corresponding columns of the grid definition management table 81 (FIG. 2) in the first embodiment, the explanation thereof is omitted. The node ID column 811A stores the ID which identifies the respective grid nodes that are set in advance on the map. The grid nodes will be described later (FIG. 13).

Accordingly, in the case of FIG. 12, the grid that is identified by having a grid ID of "10001" is associated with the grid node having a node ID of "N10001".

Figures 13, 14:
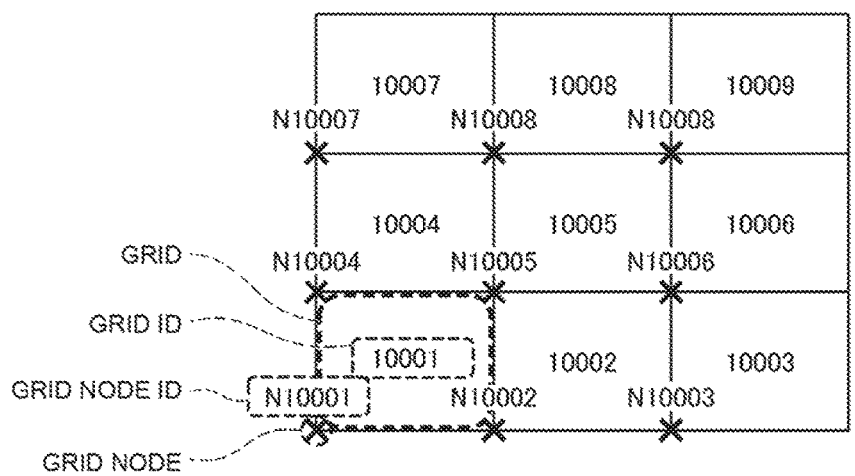
FIG. 13 is an explanatory diagram of the relationship of grids and grid nodes.
FIG. 14 is an internal configuration diagram of the grid boundary pass-through terminal count management table.

FIG. 13 is an explanatory diagram explaining the relationship of the grids and the grid nodes. Grids are the respective areas obtained by dividing a geographical space into a plurality of predetermined areas as explained above. Meanwhile, a grid node is a point that is located at any end of the grid. The ID for identifying the grid is referred to as a grid ID, and the ID for identifying the grid node is referred to as a grid node ID.

In the case of FIG. 13, the grid that is identifying by having a grid ID of "10001" forms four grid nodes at the points located at the ends (four vertexes in this example). The four grid nodes are those having a grid node ID of "N10001", "N10002", "N10004" and "N10005". When referring to FIG. 12, among these four grid nodes, the grid node having a grid node ID of "N10001" is associated with the grid having a grid ID of "10001".

FIG. 14 shows the internal configuration of the grid boundary pass-through terminal count management table 82A. The grid boundary pass-through terminal count management table 82A is a table for managing the number of terminals located at the boundary (grid boundary) between the grids; that is, the number of terminals that passed through across the grid boundary, for each aggregation time period, and is configured from an aggregation time period column 821, a grid boundary ID column 822A and a pass-through terminal count column 823A.

Since the aggregation time period column 821 is the same as the corresponding column of the grid terminal count management table 82 (FIG. 3) in the first embodiment, the explanation thereof is omitted. The grid boundary ID column 822A stores the ID which identifies the respective grain boundaries that are set in advance on the map. The grid boundary will be explained later (FIG. 14). The pass-through terminal count column 823A stores the number of terminals located on the grid boundary (that passed through the grid boundary) during the aggregation time period.

Accordingly, in the case of FIG. 14, the number of terminals that passed through the grid boundary that is identified by having a grid boundary ID of "X10001" during the aggregation time period of "2015/1/10:00-0:09" is "0" terminals.

Figure 15:
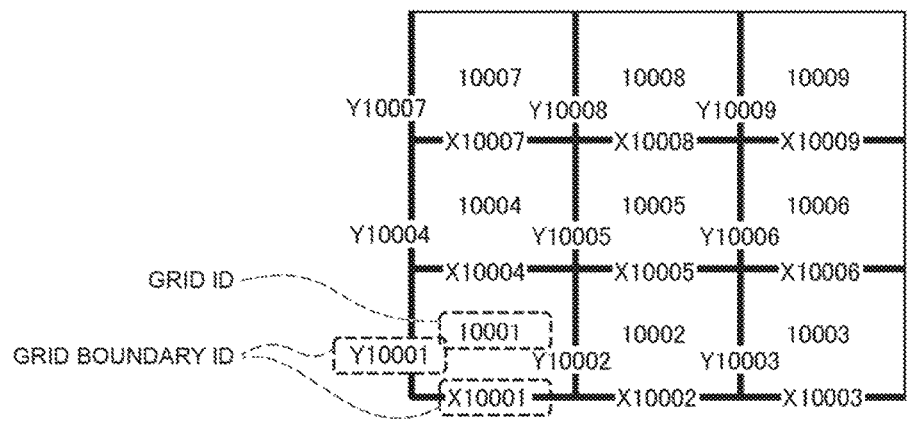
FIG. 15 is an explanatory diagram of the relationship of grids and grid nodes.

FIG. 15 is an explanatory diagram explaining the relationship of grids and grid boundaries. Grids are the respective areas obtained by dividing a geographical space into a plurality of predetermined areas as explained above. Meanwhile, a grid boundary is the boundary line between adjacent grids.

In the case of FIG. 15, the grid that is identified by having a grid ID of "10001" forms four grid boundaries with the adjacent grids. The four grid boundaries are those having a grid boundary ID of "X10001", "Y10001", "X10004" and "Y10002". When referring to FIG. 14, among these four grid boundaries, the number of portable terminals that passed through a grid boundary having a grid boundary ID of "X10001" is "0" terminals.

(2-2) Screen Configuration

Figure 16:
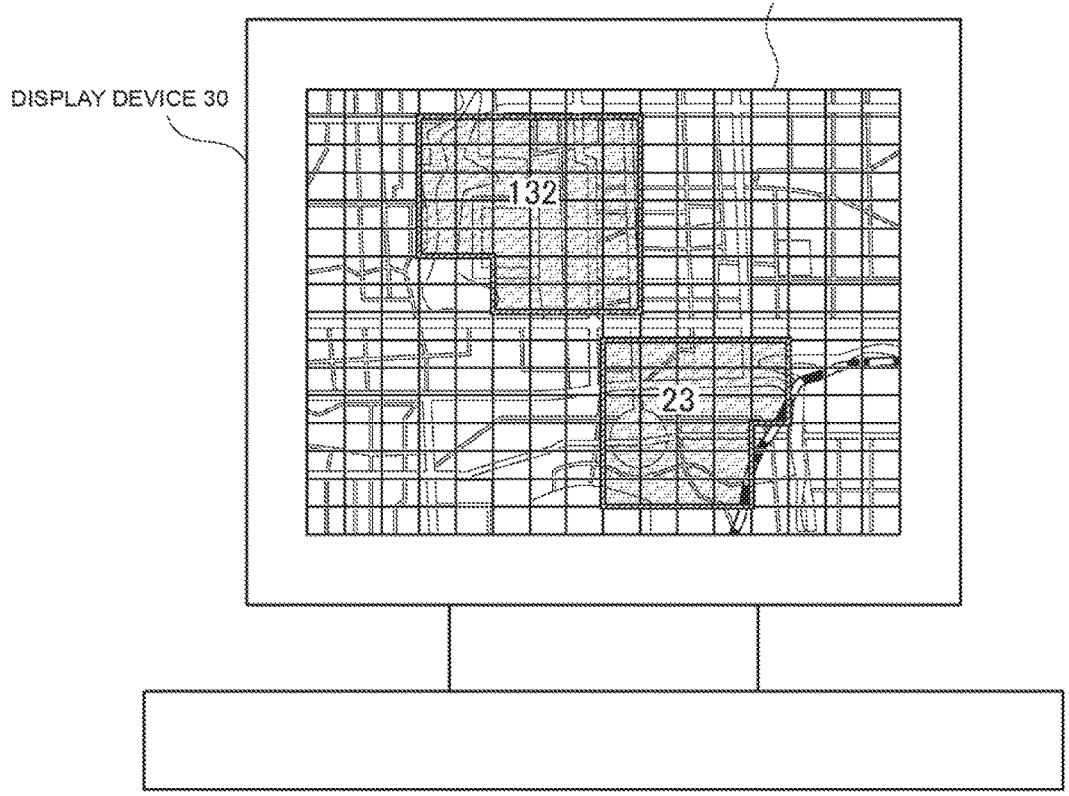
FIG. 16 is a screen configuration diagram of the confined space result display screen.

FIG. 16 shows a screen configuration of the confined space result display screen G1A. The confined space result display screen G1A is a screen that is displayed by the display device 30. On the confined space result display screen G1A, displayed are a geographical space of a predetermined range indicated based on the map data 61, and grids that are obtained by dividing the geographical space into a plurality of predetermined areas. Confined spaces are also identified.

With regard to the identification of the confined spaces, specifically, among the plurality of grid boundaries that are displayed on the geographical space, the plurality of grid boundaries included in the linked list (FIG. 5) and which form an annular shape are identified based on a color that is different from the other grid boundaries. In other words, the grid boundaries that form an annular shape when linking the grid boundaries, in which the pass-through terminal count is 0 during a predetermined time period, are identified. Note that the grids in the confined space are also identified.

Furthermore, the number of terminals located in the confined space is also displayed on the confined space result display screen G1A. Here, two confined spaces are displayed, and 132 portable terminals are located in one confined space, and 23 portable terminals are located in the other confined space. By confirming this confined space result display screen G1A, the user can confirm that there are two confined spaces and that 132 persons are isolated in one confined space and 23 persons are isolated in the other confined space.

(2-3) Flowchart

The processing contents of the various programs stored in the main storage device 70 are now explained with reference to FIG. 17 and FIG. 18. In the ensuing explanation, while each type of processing is executed based on the coordination of the processor 10 and the various programs, for the sake of convenience of explanation, the processing entity will be explained as the various programs.

Figure 17:
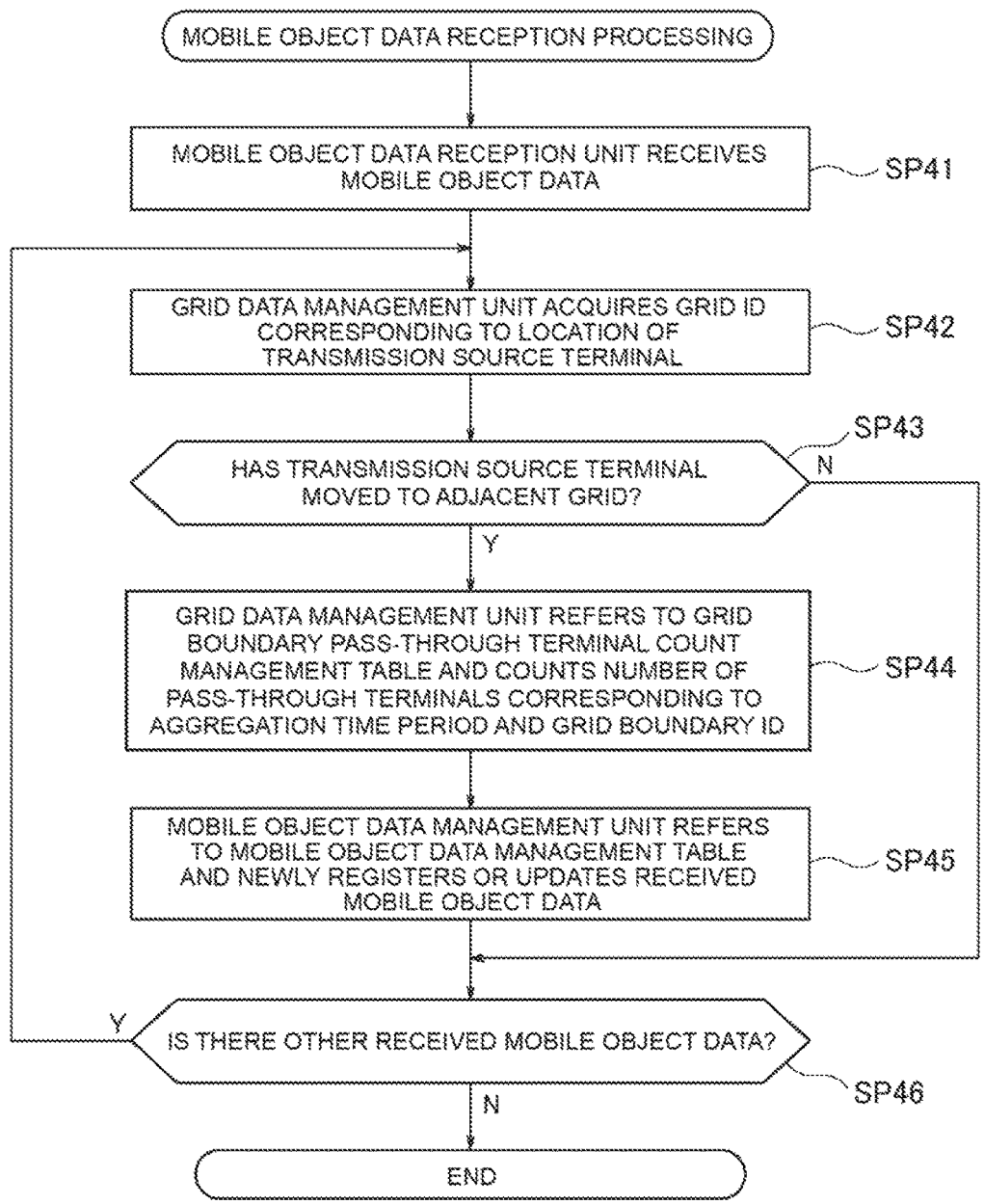
FIG. 17 is a flowchart of the mobile object data reception processing.

FIG. 17 shows a flowchart of the mobile object data reception processing. The mobile object data reception processing is executed by the mobile object data reception unit 71, the grid data management unit 72 and the mobile object data management unit 73 when the mobile object data D is sent from a portable terminal.

Since the processing of step SP41 and SP42 is the same as the mobile object data reception processing (FIG. 8: SP1 and SP2) in the first embodiment, the explanation thereof is omitted. Note that, in step SP42, the grid data management unit 72 refers to the "grid definition management table 81A", and acquires the grid ID corresponding to the location of the transmission source terminal.

Subsequently, the grid data management unit 72 refers to the grid definition management table 81A and the mobile object data management table 83, and determines whether the transmission source terminal has moved to an adjacent grid (SP43).

Specifically, the grid data management unit 72 foremost acquires the individual identification ID, the generated time and the location information (latitude, longitude, sea level, etc.) from the mobile object data D received in step SP1. Subsequently, the grid data management unit 72 refers to the mobile object data management table 83, and acquires the location information (latitude, longitude, sea level, etc.) that was previously received from the portable terminal having the same individual identification ID.

The grid data management unit 72 thereafter refers to the grid definition management table 81A, compares the grid corresponding to the location information that was currently received from the portable terminal having the same individual identification ID, and the grid corresponding to the location information that was previously received from the portable terminal having the same individual identification ID, and determines whether the transmission source terminal has moved to an adjacent grid.

For example, when referring to FIG. 15, the grid data management unit 72 determines that the transmission source terminal has moved to an adjacent grid when the grid ID of the grid corresponding to the location information that was currently received is "10002", and the grid ID of the grid corresponding to the location information that was previously received is "10003". Here, the grid data management unit 72 deems that the grid boundary having a grid boundary ID of "Y10003" is the grid boundary through which the transmission source terminal had passed, and stores this, for example, in the work area W.

When a negative result is obtained in the determination of step SP43 (SP43: N), the grid data management unit 72 proceeds to step SP46. Meanwhile, when a positive result is obtained in the determination of step SP43 (SP43: Y), the grid data management unit 72 refers to the grid boundary pass-through terminal count management table 82A, and counts the pass-through terminal count corresponding to the aggregation time period and the grid boundary ID stored in the work area W in step SP3 (SP44).

Since the processing of steps SP45 and SP46 is the same as the mobile object data reception processing (FIG. 8: SP5 and SP6) in the first embodiment, the explanation thereof is omitted.

Figure 18:
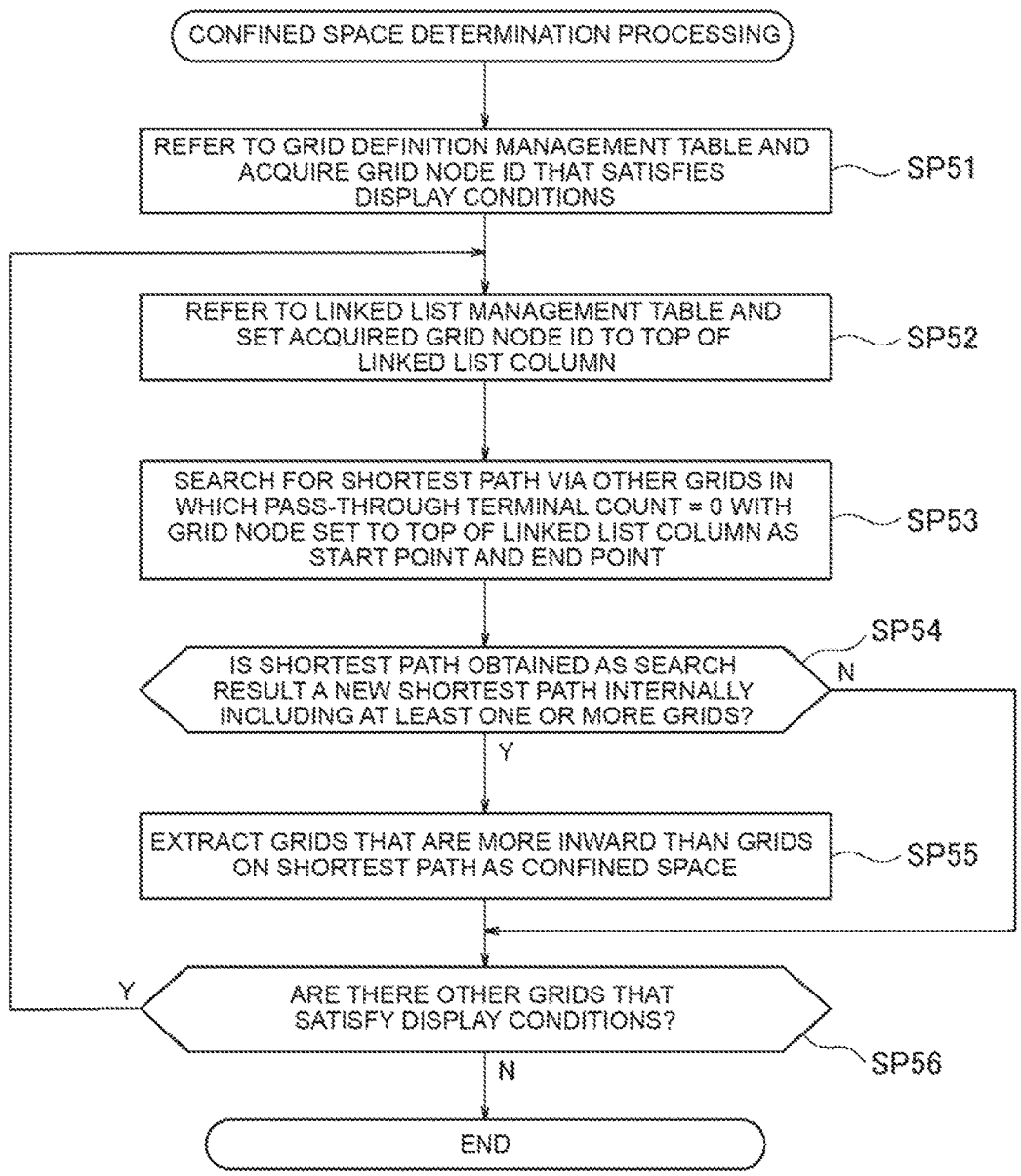
FIG. 18 is a flowchart of the confined space determination processing.

FIG. 18 shows a flowchart of the confined space determination processing. The confined space determination processing is executed by the confined space determination unit 75 when the processing of the confined space display processing (FIG. 9) proceeds to step SP12.

Foremost, the confined space determination unit 75 refers to the grid definition management table 81A, and acquires the grid ID which satisfies the display conditions (area to be displayed and time period) input in step SP11 of the confined space display processing (FIG. 9) (SP51).

Specifically, the confined space determination unit 75 foremost refers to the grid definition management table 81A, and acquires the grid ID and the corresponding grid node ID of the grids included in the area to be displayed input in step SP11. Subsequently, the confined space determination unit 75 refers to the grid terminal count management table 82, and acquires the aggregation time period that coincides with the time period input in step SP11 or that includes this time period.

The confined space determination unit 75 thereafter refers to the grid terminal count management table 82, searches for the grid ID of the grids included in the area to be displayed among the grid IDs corresponding to the acquired aggregation time period, and acquires the grid node ID corresponding to the grid ID that was obtained as the search result.

Subsequently, the confined space determination unit 75 refers to the linked list management table 84, and sets grid node ID acquired in step SP51 at the top of the linked list column 843 (SP52). The confined space determination unit 75 thereafter searches for the shortest path with the grid node set at the top of the linked list as the start and end and which goes through other grid boundaries in which the pass-through terminal count is 0 (SP53).

As the method of searching for the shortest path in step SP53, Dijkstra's algorithm or Bellman-Ford algorithm may be used. For instance, when using Dijkstra's algorithm, the grid nodes (vertexes of the grids) are deemed to be nodes, the boundary grid in which the pass-through terminal count is 0 is deemed to be an edge, and the grid node set at the top of the linked list is set as the start node and the end node.

The shortest path from the start node to the end node via intermediate nodes, when the distance between the adjacent grid nodes is 1, is searched. Note that information of the grid nodes contained in the searched path is stored in the linked list management table 84.

Subsequently, in cases where a shortest path was obtained as a result of searching for the shortest path in step SP53, the confined space determination unit 75 determines whether the obtained shortest path is a new shortest path internally containing at least one or more grids (SP54).

When the confined space determination unit 75 obtains a negative result in the determination of step SP54 (SP54: N), the confined space determination unit 75 determines that it was not possible to extract a confined space in connection with the target grid nodes acquired in step SP51, and cancels the linked list stored in the linked list management table 84 or sets that linked list to "false", and then proceeds to step SP56.

Meanwhile, when the confined space determination unit 75 obtains a positive result in the determination of step SP54 (SP54: Y), the confined space determination unit 75 extracts the grids located more internally than the grid boundaries on the shortest path as a confined space (SP55). The confined space determination unit 75 thereafter refers to the confined space management table 85, and registers the linked list ID and the number of terminals located in the confined space.

Subsequently, the confined space determination unit 75 determines whether there are other grid nodes that satisfy the display conditions (SP56). When a positive result is obtained in this determination (SP56: Y), the confined space determination unit 75 proceeds to step SP52, and repeats the foregoing processing (SP52 to SP56) to the other grid nodes.

Meanwhile, when a negative result is obtained in the foregoing determination (SP56: N), the confined space determination unit 75 determines that all grid nodes that satisfy the display conditions have been processed, and then ends this processing.

(2-4) Effect of Second Embodiment

According to the foregoing second embodiment, by dividing a geographical space into a plurality of grids, counting the number of terminals that passed through a grid boundary based on mobile object data D including location information which is sent from a portable terminal as appropriate, and, if an annular shape can be formed by linking the grid boundaries in which the pass-through terminal count remains at 0 without any change, it is possible to extract the space configured from the grids within the formed annular shape as a confined space. In the foregoing case, by deeming the grind boundary through which the portable terminal has not passed as the boundary line of the confined space, a confined space across a wide geographical area can be accurately confirmed.

(3) Third Embodiment

In the third embodiment, explained is a configuration of identifying the location of the confined space, which was extracted in the first or second embodiment, in a vertical direction. Note that the configuration that is the same as the first or second embodiment is given the same reference numeral and the explanation thereof is omitted.

(3-1) Table Configuration

Figure 19:
FIG. 19 is an internal configuration diagram of the vertical confined space management table.

FIG. 19 shows the internal configuration of the vertical confined space management table 86. The vertical confined space management table 86 is a table for managing the location of the confined space in a vertical direction, and is configured from a vertical space ID column 861, an aggregate sea level range column 862, a terminal count column 863, a confined space ID column 864 and a vertical confined space ID column 865.

The vertical space ID column 861 stores the ID which identifies the geographical space in a vertical direction. The aggregate sea level range column 862 stores the designated sea level range which is designated in advance. Here, while the designated sea level range is stored, the configuration is not necessarily limited thereto, and a designated elevation range may also be stored. The terminal count column 863 stores the number of terminals located in the designated sea level range.

The confined space ID column 864 stores the ID which identifies the confined space. The vertical confined space ID column 865 stores the ID which identifies the respective spaces upon dividing the confined space for each designated sea level range.

Accordingly, in the case of FIG. 19, in the confined space having a confined space ID of "0", "32" terminals are located in the space where the designated sea level range is "20 to 40 m", and "100" terminals are located in the space where the designated sea level range is "40 to 60 m".

(3-2) Flowchart

Figure 20:
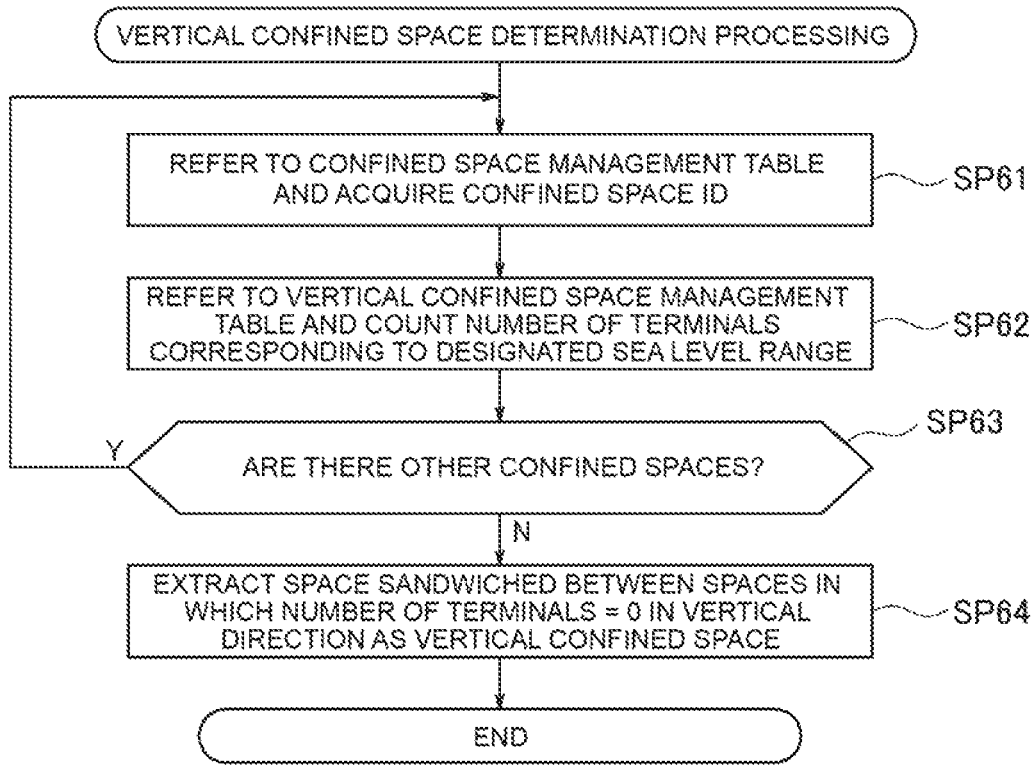
FIG. 20 is a flowchart of the vertical confined space determination.

FIG. 20 shows a flowchart of the vertical confined space determination processing. The vertical confined space determination processing is executed through the coordination of the processor 10 and the confined space determination unit 75 when the confined space determination processing (FIG. 10 or FIG. 18) in the first or second embodiment is ended. For the sake of convenience of explanation, the processing entity will be explained as the confined space determination unit 75.

Foremost, the confined space determination unit 75 refers to the confined space management table 85, and acquires the confined space ID (SP61). Specifically, the confined space determination unit 75 refers to the confined space management table 85, and acquires the confined space ID, the linked list ID and the number of terminals. The confined space determination unit 75 thereafter refers to the linked list management table 84, and acquires the time period and the grid ID or the grid node ID included in the linked list.

The confined space determination unit 75 thereafter acquires the grid ID of grids located more internally than the grids identified by the acquired grid ID or grid node ID, refers to the mobile object data management table 83, and acquires the sea level of the mobile object data D corresponding to the grid ID and time period of the acquired internal grids.

Subsequently, the confined space determination unit 75 refers to the vertical confined space management table 86, and counts the number of terminals corresponding to the designated sea level range including the acquired sea level of the mobile object data D (SP62). The confined space determination unit 75 thereafter refers to the confined space management table 85, and determines whether there are other confined spaces (SP63).

When the confined space determination unit 75 obtains a positive result in the determination of step SP63 (SP63: Y), the confined space determination unit 75 proceeds to step SP61, and repeats the foregoing processing (SP61 to SP63). Meanwhile, when the confined space determination unit 75 obtains a negative result in the foregoing determination (SP63: N), the confined space determination unit 75 extracts, as a vertical confined space, a space that is sandwiched between spaces in which the number of terminals in the vertical direction is 0 (SP64), and then ends this processing.

(3-3) Effect of Third Embodiment

According to the foregoing third embodiment, it is possible to identify the location of the confined space, which was extracted in the first or second embodiment, in a vertical direction. Thus, even in cases where a confined space is formed in a space located at a certain height or depth from the ground level (for instance, upper floors or underground of a building), it is possible to accurately confirm the confined space that is formed including the location in a vertical direction.

(4) Fourth Embodiment

In the fourth embodiment, explained is a configuration of improving the extraction accuracy of the confined space by dynamically changing the size of the grid (grid width). Note that the configuration that is the same as the first or second embodiment is given the same reference numeral and the explanation thereof is omitted.

(4-1) Flowchart

Figure 21:
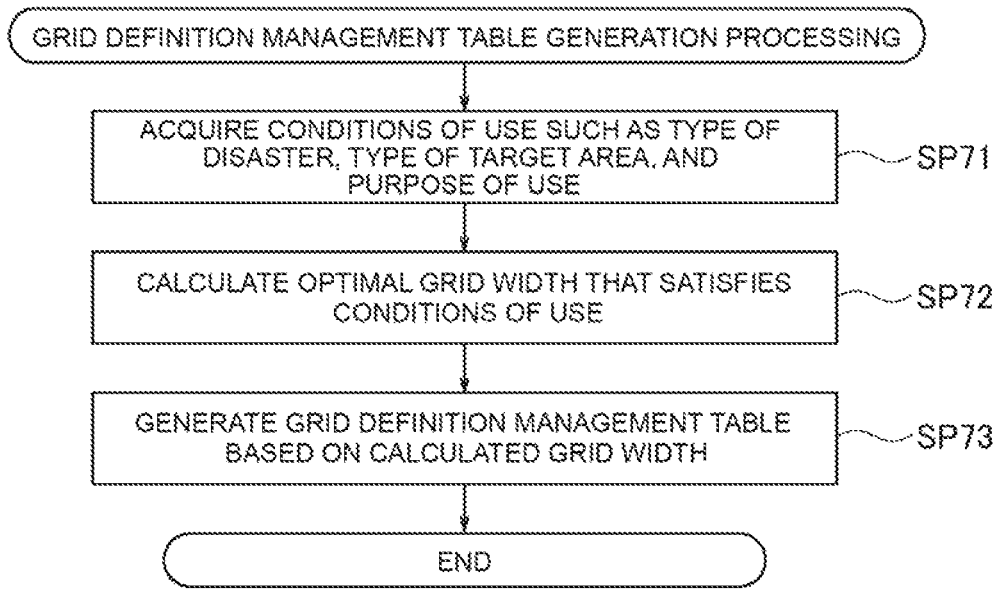
FIG. 21 is a flowchart of the grid definition management table generation processing.

FIG. 21 shows a flowchart of the grid definition management table generation processing. The grid definition management table generation processing is executed by the grid data management unit 72 when an input from the user is received.

Foremost, the grid data management unit 72 acquires, via the keyboard 40 or the mouse 50, the conditions of use such as the type of disaster, type of disaster location and objective of use from the user (SP71). As the type of disaster, there are, for example, fires, earthquakes, tidal waves, rain storms or snow storms. As the type of disaster location, there are, for example, cities, deep in the mountains, or riversides. As the objective of use, there are, for example, use for confirming the status, use for rescue, or use for sending relief supplies.

Subsequently, the grid data management unit 72 calculates the optimal grid width which satisfies the conditions of use (SP72). Note that the optimal grid width which satisfies the conditions of use shall be set by the user in advance. The grid data management unit 72 thereafter generates the grid definition management table 81 or 81A based on the grid width calculated in step SP72 (SP73), and then ends this processing.

(4-2) Effect of Fourth Embodiment

According to the foregoing fourth embodiment, the size of the grid (grid width) can be dynamically changed according to the conditions of use. Thus, the accuracy of the extracted confined space can be improved according to the usage. Here, while the optimal grid width is calculated according to the conditions of use input by the user, the configuration of the present invention is not limited to the grid width, and, for example, the optimal grid shape may also be calculated according to the conditions of use.

REFERENCE SIGNS LIST

1 Confined space estimation system
10 Processor
70 Main storage device
71 Mobile object data reception unit
72 Grid data management unit
73 Mobile object data management unit
74 Confined space display request acceptance unit
75 Confined space determination unit
76 Confined space result display unit
81, 81A Grid definition management table
82 Grid terminal count management table
82A Grid boundary pass-through terminal count management table
83 Mobile object data management table
84 Linked list management table
85 Confined space management table
86 Vertical confined space management table

The invention claimed is:

1. A confined space estimation system which estimates a confined space, comprising:
a storage device which stores information indicating a geographical space; and
a processor which divides the geographical space into a plurality of grids,
wherein, based on location information sent from a terminal, the processor:
periodically aggregates a number of terminals within the grids or a number of terminals that passed through boundaries between the grids;
extracts grids or boundaries in which the aggregated number of terminals is a predetermined number and in which there is no change in the aggregated number of terminals;
determines whether the extracted grids or boundaries can be linked to form an annular shape; and
estimates, if the annular shape can be formed, a geographical space configured from the grids within the formed annular shape as the confined space
wherein, upon determining whether the extracted grids can be linked to form an annular shape, the processor:
sets one grid among the extracted grids as a start node and an end node, sets other grids other than the start node and the end node as intermediate nodes, and determines whether the annular shape can be formed by searching for a shortest path from the start node to the end node via any one of or all of the intermediate nodes.

2. The confined space estimation system according to claim 1, wherein, upon extracting grids in which the aggregated number of terminals is a predetermined number and in which there is no change in the aggregated number of terminals, the processor:
extracts grids configuring a geographical space of a designated area, and extracts grids in which a number of terminals within the extracted grids in a designated time period is the predetermined number.

3. The confined space estimation system according to claim 1, wherein, upon extracting boundaries in which the aggregated number of terminals is a predetermined number and in which there is no change in the aggregated number of terminals, the processor:
extracts grids configuring a geographical space of a designated area, and extracts boundaries in which a number of terminals that passed through boundaries between the extracted grids in a designated time period is the predetermined number.

4. The confined space estimation system according to claim 1, wherein, upon determining whether the extracted grids can be linked to form an annular shape, the processor:
sets one boundary among the extracted boundaries as a start node and an end node, sets other boundaries other than the start node and the end node as intermediate nodes, and determines whether the annular shape can be formed by searching for a shortest path from the start node to the end node via any one of or all of the intermediate nodes.

5. The confined space estimation system according to claim 1, further comprising:
a display device which displays the geographical space, wherein the processor:
overlays the estimated confined space and the number of terminals within the confined space on the geographical space, and displays the overlaid geographical space on the display device.

6. The confined space estimation system according to claim 1, wherein the processor:
aggregates the number of terminals in the estimated confined space for each designated range in a vertical direction; and
manages the number of terminals in the confined space for each of the designated ranges.

7. The confined space estimation system according to claim 1, wherein the processor:
divides the geographical space into a plurality of grids based on a predetermined grid width according to conditions of use including type of disaster, type of disaster location, and objective of estimating the confined space.

8. A confined space estimation method of a confined space estimation system which estimates a confined space, wherein the confined space estimation system comprises:

a storage device which stores information indicating a geographical space; and a processor which divides the geographical space into a plurality of grids, wherein the confined space estimation method comprises:

a first step of the processor periodically aggregating a number of terminals within the grids or a number of terminals that passed through boundaries between the grids based on location information sent from a terminal;

a second step of the processor extracting grids or boundaries in which the aggregated number of terminals is a predetermined number and in which there is no change in the aggregated number of terminals;

a third step of the processor determining whether the extracted grids or boundaries can be linked to form an annular shape; and a fourth step of the processor estimating, if the annular shape can be formed, a geographical space configured from the grids within the formed annular shape as the confined space wherein, upon the third step of the processor determining whether the extracted grids can be linked to form an annular shape, the processor:

sets one grid among the extracted grids as a start node and an end node, sets other grids other than the start node and the end node as intermediate nodes, and determines whether the annular shape can be formed by searching for a shortest path from the start node to the end node via any one of or all of the intermediate nodes.

* * * * *